United States Patent
Sugaya et al.

(10) Patent No.: US 7,421,051 B2
(45) Date of Patent: Sep. 2, 2008

(54) RADIO COMMUNICATION SYSTEM AND METHOD, WIRELESS NETWORK FORMING DEVICE, RADIO TRANSMISSION UNIT AND METHOD, AND RADIO RECEPTION UNIT AND METHOD

(75) Inventors: Shigeru Sugaya, Kanagawa (JP); Takushi Kunihiro, Tokyo (JP)

(73) Assignee: Sony Corporation (JP)

(*) Notice: Subject to any disclaimer, the term of this patent is extended or adjusted under 35 U.S.C. 154(b) by 727 days.

(21) Appl. No.: 10/353,510

(22) Filed: Jan. 29, 2003

(65) Prior Publication Data
US 2003/0174779 A1 Sep. 18, 2003

(30) Foreign Application Priority Data
Feb. 12, 2002 (JP) ............................ P2002-034573

(51) Int. Cl.
*H04L 7/00* (2006.01)
(52) U.S. Cl. ...................................................... 375/356
(58) Field of Classification Search ................. 375/130, 375/369, 370, 259, 354, 355, 356; 370/298, 370/301, 302, 304, 305; 455/422.1, 424, 455/426.1, 145
See application file for complete search history.

(56) References Cited

U.S. PATENT DOCUMENTS

| 6,192,230 | B1 * | 2/2001 | van Bokhorst et al. ... 455/343.3 |
| 6,674,737 | B1 * | 1/2004 | Baker .......................... 370/338 |
| 7,221,686 | B1 * | 5/2007 | Belcea ........................ 370/509 |
| 2003/0114204 | A1 * | 6/2003 | Allen et al. .................. 455/574 |

* cited by examiner

*Primary Examiner*—Sam K Ahn
(74) *Attorney, Agent, or Firm*—Lerner, David, Littenberg, Krumholz & Mentlik, LLP

(57) ABSTRACT

Radio communication devices receive timing reference pulses from a timing generation device and can acquire synchronism based on the received pulses, so that even on the ultra wide band (UWB) radio communication system, where there is no carrier as exists in the conventional radio communication systems, there is no need to add a redundant preamble signal ahead of transmitted information in order to acquire initial synchronism. In order to receive an asynchronous signal, there is no need to perform detection for a very long time to find whether the signal is present or absent. The application of an access control system according to the present invention to UWB radio communication implements high-speed asynchronous radio communication.

21 Claims, 13 Drawing Sheets

F I G. 2
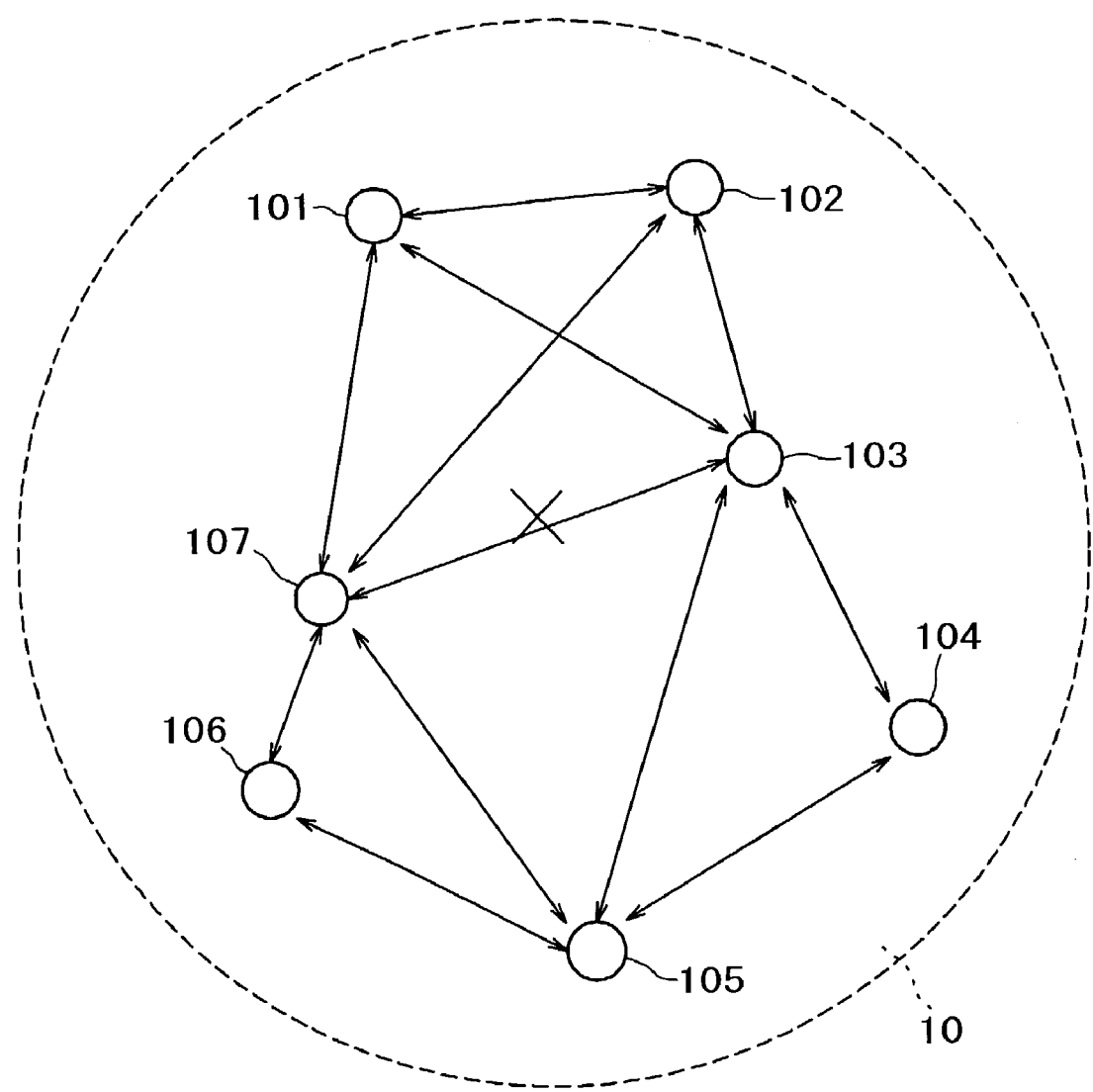

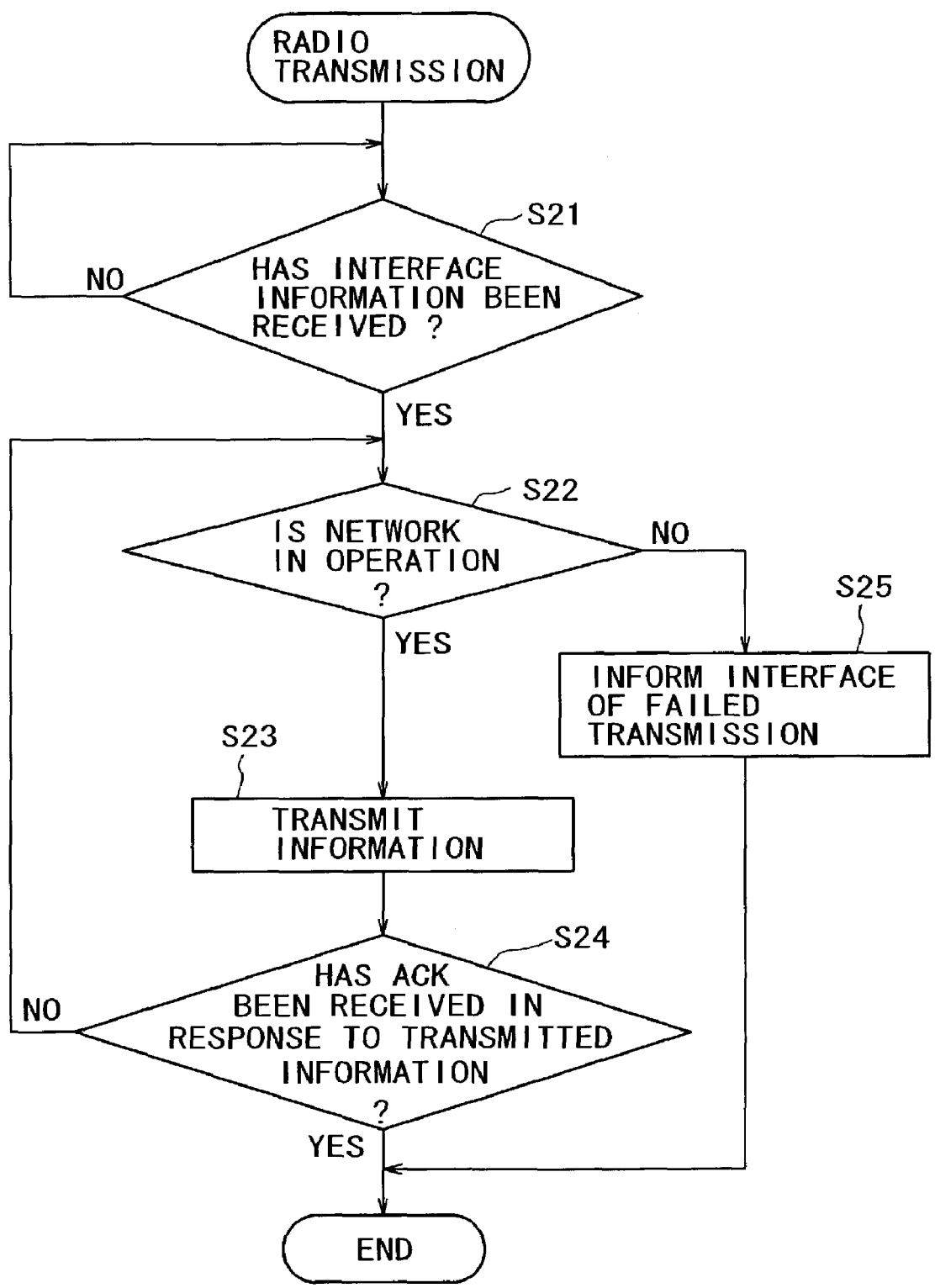
F I G. 1 2

F I G. 1 3
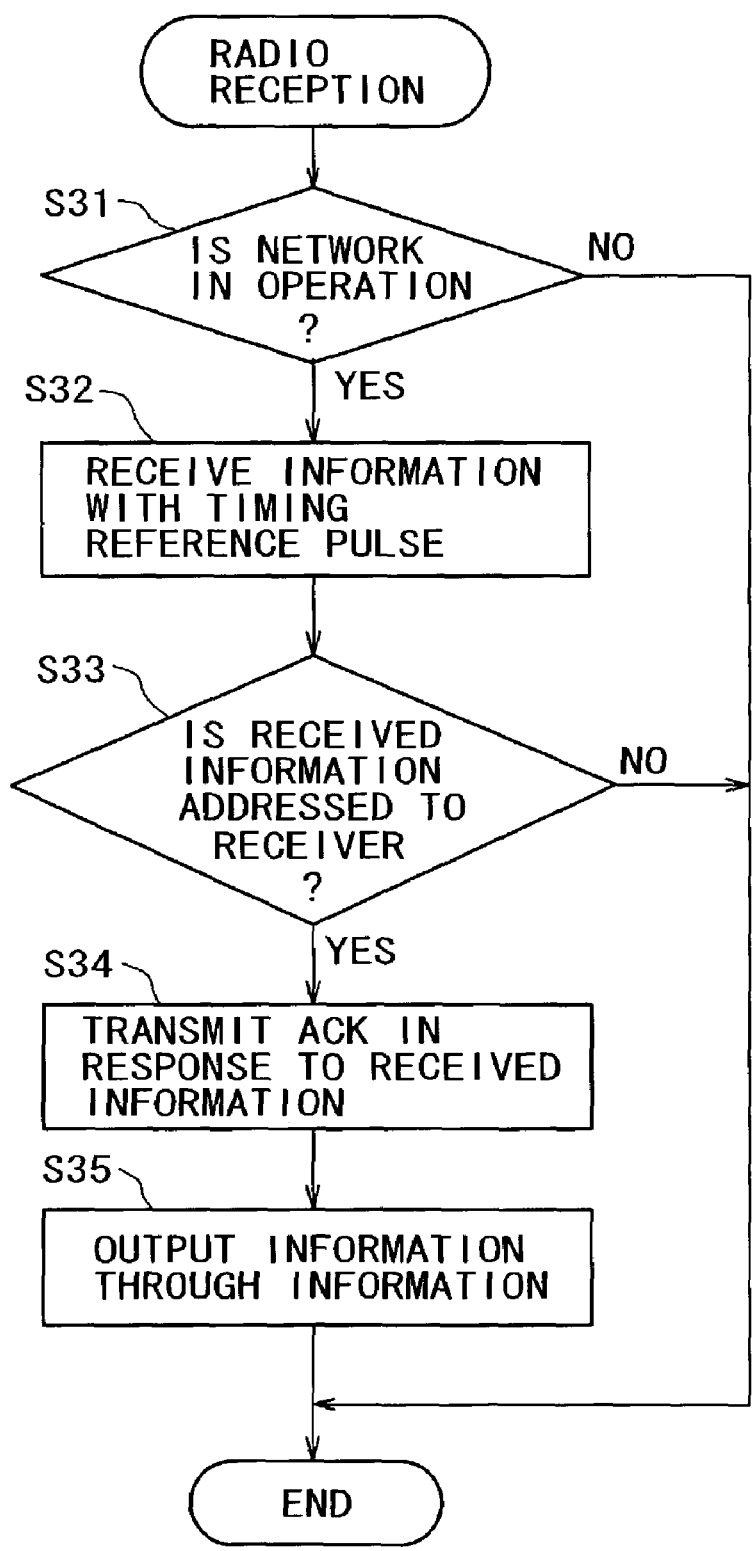

RADIO COMMUNICATION SYSTEM AND METHOD, WIRELESS NETWORK FORMING DEVICE, RADIO TRANSMISSION UNIT AND METHOD, AND RADIO RECEPTION UNIT AND METHOD

BACKGROUND OF THE INVENTION

1. Field of the Invention

The present invention relates to a radio communication system, a radio communication method, a wireless network forming device, a radio transmission unit, a radio transmission method, a radio reception unit and a radio reception method for intercommunicating among radio stations. In particular, the invention relates to a radio communication system, a radio communication method, a wireless network forming device, a radio transmission unit, a radio transmission method, a radio reception unit and a radio reception method for communicating asynchronously by radio without providing any device as a control station.

More specifically, the present invention relates to a radio communication system, a radio communication method, a wireless network forming device, a radio transmission unit, a radio transmission method, a radio reception unit and a radio reception method for communicating asynchronously in a radio communication environment where the carrier sense for determining how a transmission channel is used is difficult. In particular, the invention relates to a radio communication system, a radio communication method, a wireless network forming device, a radio transmission units, a radio transmission method, a radio reception unit and a radio reception method for communicating asynchronously, with a radio transmission channel used efficiently, on the UWB (ultra wide band) system or another radio communication system on which carrier sense is difficult.

2. Description of the Related Art

Improved computer functions have promoted the interconnection of computers for the establishment of LANs (local area networks). A LAN makes it possible to share information such as a file or data and a peripheral device such as a printer. A LAN also makes it possible to transfer electronic mail and data, and to interchange other information.

The computers in the conventional LANs are interconnected by optical fiber cables, coaxial cables or twisted pair cables. The wired LANs require a wiring work, which makes it difficult to build them, and the cables are complicated. After the LANs are built, they are inconvenient because the cable lengths limit the range where the interconnected devices can be moved.

Radio LANs receive attention as systems that relieve users of the cables of the wired LANs. A wireless LAN can eliminate most of the cables in a working space such as an office, making it relatively easy to move the communication terminals such as personal computers (PCs) in this LAN.

In recent years, as wireless LAN systems have become higher in speed and cheaper, they have grown considerably in demand. In particular, the introduction of personal area networks (PANs) has recently been considered for information communication in a small-scale wireless network built among electronic devices existing around.

It is considered suitable or reasonable that a small-scale wireless network formed of comparatively few clients located near each other is built as an ad hoc communication network, through which any terminals can perform asynchronous radio communication directly among them without using a specific access point.

In general, the asynchronous communication in such small-scale wireless networks involves access control on the CSMA/CA (carrier sense multiple access with collision avoidance) system.

The CSMA/CD system is a collision detection system, on which a communication device transmits a signal and receives this signal to determine whether or not its information transmission collides with the information transmission from other communication devices. The CSMA/CD system is used mainly for wired communication. For radio communication, it is difficult for a communication device to receive the signal transmitted by itself. Accordingly, on the CSMA/CA system, a communication device avoids collision by starting to transmit information after checking that no other communication device is transmitting information. Such an access control system makes two or more communication devices capable of multiple access through the same radio transmission channel shared by them.

In general, a method for sensing a carrier on a radio transmission channel involves a mechanism that uses a specific frequency carrier.

In a radio communication system, the terminals forming a wireless network communicate asynchronously by radio. In order for one of the terminals to successfully receive a radio signal transmitted from another, a method for transmitting information with a preamble signal added ahead of it is widely used. According to this method, one of the terminals transmits a preamble signal, which is received by another for synchronism between the two terminals.

Recently, high speed radio transmission technologies have been studied and developed, one of which is the UWB (ultra wide band) system. The UWB system is a radio communication system that achieves high speed data communication by transmitting and receiving data spread over a very wide frequency band on the order of some gigahertz. This frequency band is an ultra high frequency band, which may range from 2 GHz to 6 GHz.

In the UWB system, trains of impulse signals of information are transmitted and received, each having a very short period on the order of hundreds of picoseconds. The occupied bandwidth is such a bandwidth on the order of some gigahertz that the occupied bandwidth divided by the center frequency is about one. The center frequency may range from 1 GHz to 10 GHz. This bandwidth is extremely wide even as compared with the bandwidth used commonly in wireless LANs on the W-CDMA, cdma 2000, SS (spread spectrum) or OFDM (orthogonal frequency division multiplexing) system.

The trains of impulse signals used in the UWB radio communication system have no specific frequency carriers. In this system, carrier sense is difficult because no specific frequency carrier includes a signal component.

Accordingly, the CSMA/CA system used widely in conventional radio communication systems cannot be applied as it is for UWB radio communication.

In order to receive a signal transmitted asynchronously by radio using the UWB radio communication technology, it is necessary to perform detection for a very long time to find whether the signal is present or absent.

In the UWB radio communication system, there is no carrier as exists in the conventional radio communication systems. Therefore, in this system, in order for a terminal as a receiver to detect a signal for initial synchronization of an information signal, it is necessary for a preamble signal more redundant than the conventional one to be added ahead of the transmitted information.

SUMMARY OF THE INVENTION

An object of the present invention is to provide an improved radio communication system, an improved radio communication method, an improved wireless network forming device, an improved radio transmission unit, an improved radio transmission method, an improved radio reception unit and an improved radio reception method that are capable of asynchronous radio communication without providing any device as a control station.

Another object of the present invention is to provide an improved radio communication system, an improved radio communication method, an improved wireless network forming device, an improved radio transmission unit, an improved radio transmission method, an improved radio reception unit and an improved radio reception method that are capable of asynchronous communication even in a radio communication environment where the carrier sense for determining how a transmission channel is used is difficult.

Still another object of the present invention is to provide an improved radio communication system, an improved radio communication method, an improved wireless network forming device, an improved radio transmission unit, an improved radio transmission method, an improved radio reception unit and an improved radio reception method that are capable of asynchronous communication, with a radio transmission channel used efficiently, on the UWB (ultra wide band) system or another radio communication system on which carrier sense is difficult.

The present invention has been made for the foregoing objects. A first aspect of the invention is a radio communication system or a radio communication method for ad hoc communication by means of a plurality of radio communication devices. A timing generation device is provided for transmitting reference pulses at predetermined intervals. A wireless network is formed of the radio communication devices existing in the arrival range of the reference pulses.

Herein, the terms "radio communication system" mean a logical aggregate of radio communication devices (or functional modules that implement specific functions), whether the devices (or functional modules) are in a single casing or not.

According to the first aspect of the invention, only by providing a timing generation device for supplying reference pulses, it is possible to build a wireless network for ad hoc communication that is direct communication among radio communication devices in the arrival range of the reference pulses. If the arrival range is the area of the wireless network, this area is easy to define.

Receiving reference pulses from the timing generation device, each of the radio communication devices can perform synchronous processing and/or transmit-receive timing control based on the pulses. This makes it easy to control the asynchronous communication among the radio communication devices in the wireless network.

The timing generation device may start and/or stop transmitting reference pulses in response to a user operation. This makes it easy to build the wireless network in the arrival range of the reference pulses only for a desired period during which reference pulses are transmitted in accordance with the user operation.

The timing generation device may generate a proper or local pattern of reference pulses. Receiving this pattern of reference pulses and decoding the pulse pattern, each of the radio communication devices can sense which wireless network it is logging in to. Of course, each of the radio communication devices may log in to two or more adjoining wireless networks at the same time. In this case, based on the proper patterns of reference pulses from the adjoining wireless networks, the radio communication device can detect its operation on each of these networks.

UWB (ultra wide band) radio communication may be performed among the radio communication devices incorporated into the wireless network by receiving reference pulses from the timing generation device. UWB radio communication involves transmitting and receiving data spread over a very wide frequency band.

The trains of impulse signals used in the UWB radio communication system have no specific frequency carriers. Accordingly, carrier sense is difficult, and the CSMA/CA system cannot be applied as it is for UWB radio communication. In order to receive asynchronous signals on the UWB radio communication system, it is necessary to add a redundant preamble signal ahead of the transmitted information.

According to the present invention, by contrast, each of the radio communication devices can acquire synchronism based on the reference pulses received from the timing generation device. Accordingly, even for UWB radio communication, there is no need to add a redundant preamble signal ahead of transmitted information to acquire initial synchronism. Consequently, by applying an access control system according to the invention to UWB radio communication, it is possible to implement high speed asynchronous radio communication.

A second aspect of the present invention is a network forming device for building a wireless network for asynchronous information transmission by means of a plurality of radio communication devices. The network forming device includes a signal generator for generating reference pulses at predetermined intervals that the radio communication devices in the wireless network use for synchronous processing and/or transmit-receive timing control. The network forming device also includes a signal transmitter for transmitting the generated reference pulses.

Receiving reference pulses from the network forming device, the radio communication devices can easily implement asynchronous communication among them by performing synchronous processing and/or transmit-receive timing control based on the received pulses.

Accordingly, the provision of the network forming device makes it easy to build a wireless network for ad hoc communication that is direct communication among radio communication devices. If the arrival range of the reference pulses is the area of the wireless network, this area is easy to define.

The network forming device may generate a proper or local pattern of reference pulses. Receiving this pattern of reference pulses and decoding the pulse pattern, each of the radio communication devices can sense which wireless network it is logging into. Of course, each of the radio communication devices may log in to two or more adjoining wireless networks at the same time. In this case, based on the proper patterns of reference pulses from the adjoining wireless networks, the radio communication device can detect its operation on each of these networks.

UWB (ultra wide band) radio communication may be performed among the radio communication devices incorporated into the wireless network by receiving reference pulses from the network forming device. UWB radio communication involves transmitting and receiving data spread over a very wide frequency band. Each of the radio communication devices can acquire the synchronism in the network based on the reference pulses received from the network forming device. Accordingly, even for UWB radio communication, there is no need to add a redundant preamble signal ahead of transmitted information to acquire initial synchronism. Consequently, only by providing the network forming device according to the invention, it is possible to implement high speed asynchronous radio communication by means of UWB radio communication.

The network forming device may further include a user input means for accepting a user operation. The signal transmitter may start and/or stop transmitting reference pulses in response to a user operation through the user input means. This makes it easy to build the wireless network in the arrival range of the reference pulses only for a desired period during which reference pulses are transmitted in accordance with the user operation.

A third aspect of the present invention is a radio transmission unit for operating or a radio transmission method for use in a wireless network for ad hoc communication. The radio transmission unit or method includes means for or the step of receiving reference pulses transmitted from a predetermined network forming device. The radio transmission unit or method also includes means for or the step of starting to transmit information based on the received reference pulses.

The radio transmission unit or method can easily implement asynchronous communication with a radio reception unit by performing synchronous processing and/or transmission timing control based on the received reference pulses.

The radio transmission unit or method may perform a network operation only while reference pulses are received.

Accordingly, the radio transmission unit or method makes it possible to log in to the wireless network and easily perform asynchronous radio transmission by means of ad hoc communication by providing the radio transmission unit in the arrival range of the reference pulses.

The arrival range of the reference pulses is the area of the wireless network. The radio transmission unit may display a network operation in response to its reception of reference pulses so that the network area can be easily defined.

The network forming device may generate a proper or local pattern of reference pulses. By decoding the pattern of the reference pulses received by the radio transmission unit, this unit can sense which wireless network it is logging in to. Of course, one radio communication device may log in to two or more adjoining wireless networks at the same time. In this case, based on the proper patterns of reference pulses from the adjoining wireless networks, the radio communication device can detect its operation on each of these networks. The display of the network operation may be switched for the wireless network to which the radio communication device is logging in.

The radio transmission unit or method can acquire synchronism based on the reference pulses received from the network forming device. Accordingly, even for UWB radio communication, there is no need to add a redundant preamble signal ahead of transmitted information to acquire initial synchronism.

A fourth aspect of the present invention is a radio reception unit for operating or a radio reception method for use in a wireless network for ad hoc communication. The radio reception unit or method includes means for or the step of receiving reference pulses transmitted from a predetermined network forming device. The radio reception unit or method also includes means for or the step of starting to receive information based on the received reference pulses.

The radio reception unit or method can easily implement asynchronous communication with a radio transmission unit by performing synchronous processing and/or reception timing control based on the received reference pulses.

The radio reception unit or method may perform a network operation only while reference pulses are received.

Accordingly, the radio reception unit or method makes it possible to log in to the wireless network and easily perform asynchronous radio transmission by means of ad hoc communication by providing the radio reception unit in the arrival range of the reference pulses.

The arrival range of the reference pulses is the area of the wireless network. The radio reception unit may display a network operation in response to its reception of reference pulses so that the network area can be easily defined.

The network forming device may generate a proper or local pattern of reference pulses. By decoding the pattern of the reference pulses received by the radio reception unit, this unit can sense which wireless network it is logging in to. Of course, one radio communication device may log in to two or more adjoining wireless networks at the same time. In this case, based on the proper patterns of reference pulses from the adjoining wireless networks, the radio communication device can detect its operation on each of these networks. The display of the network operation may be switched for the wireless network to which the radio communication device is logging in.

The radio reception unit can acquire synchronism based on the reference pulses received from the network forming device. Accordingly, even for UWB radio communication, there is no need to add a redundant preamble signal ahead of transmitted information to acquire initial synchronism.

Other objects, features and advantages of the present invention will become apparent from the description detailed below of a preferred embodiment of the invention with reference to the accompanying drawings.

BRIEF DESCRIPTION OF THE DRAWINGS

FIG. 2 is a view illustrating the connection among the radio communication devices 101-107 in the wireless network 10 shown in FIG. 1.

FIG. 12 is a flowchart of the procedure according to which a radio communication device in the wireless network 10 according to the embodiment transmits information.

FIG. 13 is a flowchart of the procedure according to which a radio communication device in the wireless network 10 according to the embodiment receives information.

DETAILED DESCRIPTION OF A PREFERRED EMBODIMENT

A preferred embodiment of the present invention will be described in detail with reference to the accompanying drawings.

Figure 1:
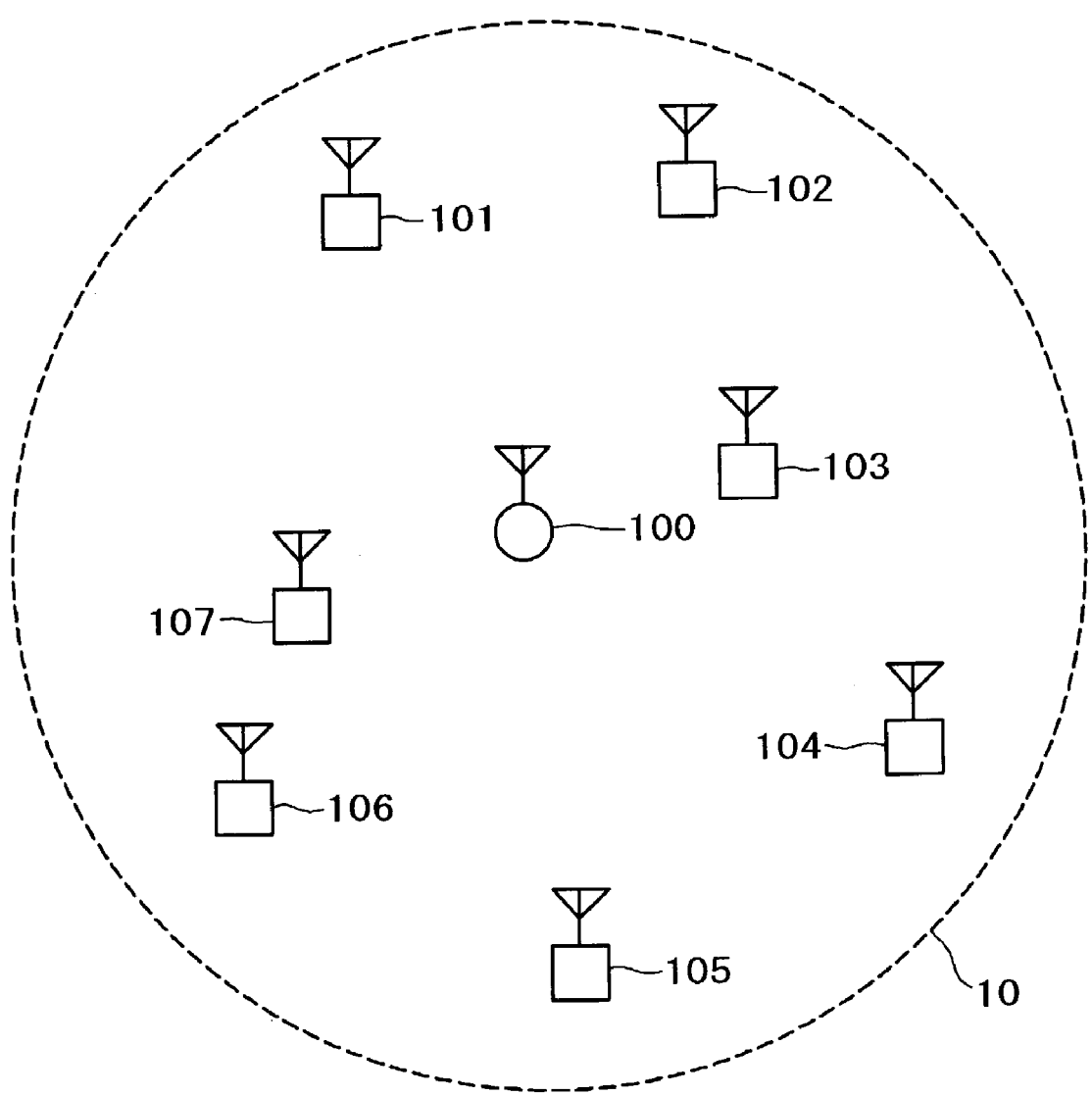
FIG. 1 is a view typically showing the configuration of a wireless network 10 according to an embodiment of the present invention.

FIG. 1 typically shows the configuration of a wireless network 10 according to the embodiment. The wireless network 10 includes radio communication devices 101-107.

Each of the radio communication devices 101-107 may consist of a personal computer (PC) or another general computer system and a radio communication unit (not shown) connected locally to this system. The radio communication unit has functions of radio transmission and radio reception for asynchronous transmission of information.

The radio communication unit may be a network interface card (NIC) in the form of an adapter card or a PC card, which can be fitted to the main body of the computer system. The radio communication unit implements radio communication by cooperating with radio communication unit drive software, which can be started on the computer system.

As shown in FIG. 1, a timing generation device 100 is positioned in the wireless network 10 and transmits timing reference pulses for use in the network 10. The radio communication devices 101-107 performs radio transmission based on the reference pulses received from the timing generation device 100.

On the assumption that the timing reference pulses from the timing generation device 100 propagate in the region defined by the broken line in FIG. 1, FIG. 1 shows all of the radio communication devices 101-107 being able to receive signals at the same timing.

FIG. 2 illustrates the connection among the radio communication devices 101-107 in the wireless network 10 shown in FIG. 1.

FIG. 2 shows the radio communication device 101 being able to easily transmit information to and easily receive information from the radio communication devices 102, 103 and 107, which are relatively near to it. FIG. 2 also shows this device 101 being unable to communicate by radio with the devices 104-106, which are relatively far from it.

Likewise, FIG. 2 shows the radio communication device 102 being able to easily transmit information to and easily receive information from the radio communication devices 101, 103 and 107, which are relatively near to it. FIG. 2 further shows this device 102 being unable to communicate by radio with the devices 104-106, which are relatively far from it.

Likewise, FIG. 2 shows the radio communication device 103 being able to easily transmit information to and easily receive information from the radio communication devices 101, 102, 104, 105 and 107, which are relatively near to it. FIG. 2 further shows this device 103 being unable to communicate by radio with the device 106, which is relatively far from it.

Likewise, FIG. 2 shows the radio communication device 104 being able to easily transmit information to and easily receive information from the radio communication devices 103 and 105, which are relatively near to it. FIG. 2 further shows this device 104 being unable to communicate by radio with the devices 101, 102, 106 and 107, which are relatively far from it.

Likewise, FIG. 2 shows the radio communication device 105 being able to easily transmit information to and easily receive information from the radio communication devices 103, 104, 106 and 107, which are relatively near to it. FIG. 2 further shows this device 105 being unable to communicate by radio with the devices 101 and 102, which are relatively far from it.

Likewise, FIG. 2 shows the radio communication device 106 being able to easily transmit information to and easily receive information from the radio communication devices 105 and 107, which are relatively near to it. FIG. 2 further shows this device 106 being unable to communicate by radio with the devices 101-104, which are relatively far from it.

Likewise, FIG. 2 shows the radio communication device 107 being able to easily transmit information to and easily receive information from the radio communication devices 101-103, 105 and 106, which are relatively near to it. FIG. 2 further shows this device 107 being unable to communicate by radio with the device 104, which is relatively far from it.

Figure 3:
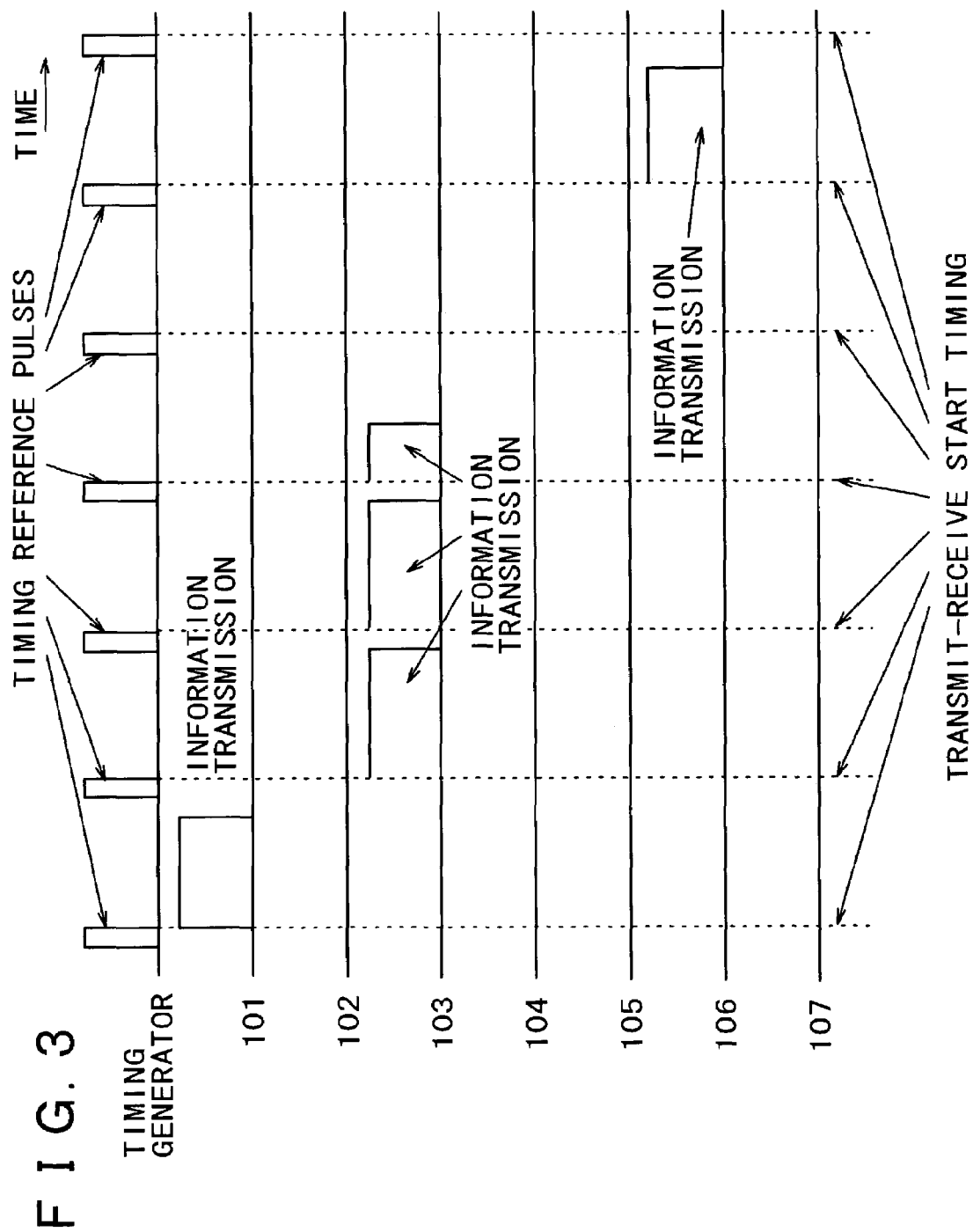
FIG. 3 is a chart showing how the communication by means of the radio communication devices 101-107 in the wireless network 10 is controlled with timing reference pulses generated by a timing generation device 100.

FIG. 3 shows an example of operation control of asynchronous radio communication in the wireless network 10.

The radio communication devices 101-107 form the network based on timing reference pulses generated by the timing generation device 100. These devices 101-107 are capable of ad hoc communication with other radio communication devices existing around the wireless network 10.

In the example shown in FIG. 3, the first timing reference pulse triggers information transmission from the radio communication device 101. The next timing reference pulse triggers information transmission over two or more timing cycles from the radio communication device 103. The next timing reference pulse does not trigger information transmission from any of the radio communication devices. The next timing reference pulse triggers short information transmission from the radio communication device 106.

The information transmission is based on timing reference pulses from the timing generation device 100. This makes it easy for the radio communication devices 101-107, which form the wireless network 10, to receive asynchronous information transmission by receiving information at the timing defined by the timing reference pulses.

Figure 4:
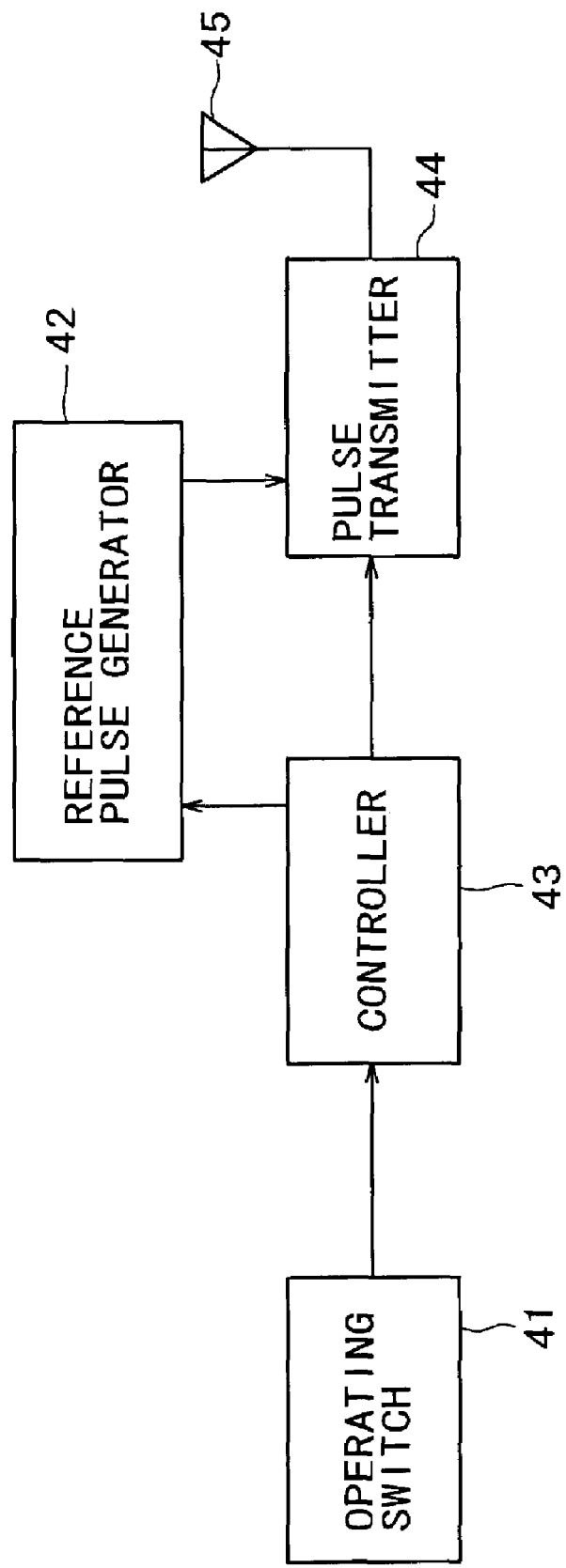
FIG. 4 is a diagram typically showing the functional configuration of the timing generation device 100 applied to the wireless network 10 according to the embodiment.

FIG. 4 typically shows the functional configuration of the timing generation device 100, which consists of an operating switch 41, a reference pulse generator 42, a controller 43, a pulse transmitter 44 and an antenna 45.

The operation of the operating switch 41 starts the controller 43. Controlled by the controller 43, the reference pulse generator 42 generates pulses periodically at regular intervals. The pulse transmitter 44 receives the pulses from the generator 42 and radios them through the antenna 45.

The radio communication devices 101-107 receive timing reference pulses from the timing generation device 100. These devices 101-107 can easily implement asynchronous communication among them by means of synchronous processing and transmit-receive timing control based on the received pulses.

Accordingly, the provision of the timing generation device 100 makes it easy to build the wireless network 10 for ad hoc communication as direct communication among radio communication devices. If the arrival range of the reference pulses is restricted within the wireless network 10, it is easy to define the area of this network 10.

The timing generation device 100 may generate a proper or local pattern of reference pulses. Receiving this pattern of reference pulses and decoding the pulse pattern, each of the radio communication devices 101-107 can sense which wireless network it is logging in to. Of course, each of the radio communication devices 101-107 may log in to two or more adjoining wireless networks at the same time. In this case, based on the proper patterns of reference pulses from the adjoining wireless networks, the radio communication device can detect its operation on each of these networks.

Receiving timing reference pulses from the timing generation device 100, the radio communication devices 101-107 may perform UWB (ultra wide band) radio communication among them for the transmission and reception of data spread over an extremely wide frequency band. In this case, because each of the radio communication devices 101-107 can acquire synchronism based on the reference pulses from the timing generation device 100, there is no need to add a redundant preamble signal ahead of transmitted information in order to acquire initial synchronism. Accordingly, by merely providing the timing generation device 100, it is possible to implement high speed asynchronous radio communication by means of UWB radio communication.

In response to the operation of the operating switch 41 by a user, the timing generation device 100 starts and/or stop transmitting reference pulses. Only for a desired period during which reference pulses are transmitted, the wireless network 10 can be built easily in the arrival range of these pulses.

Figure 5:
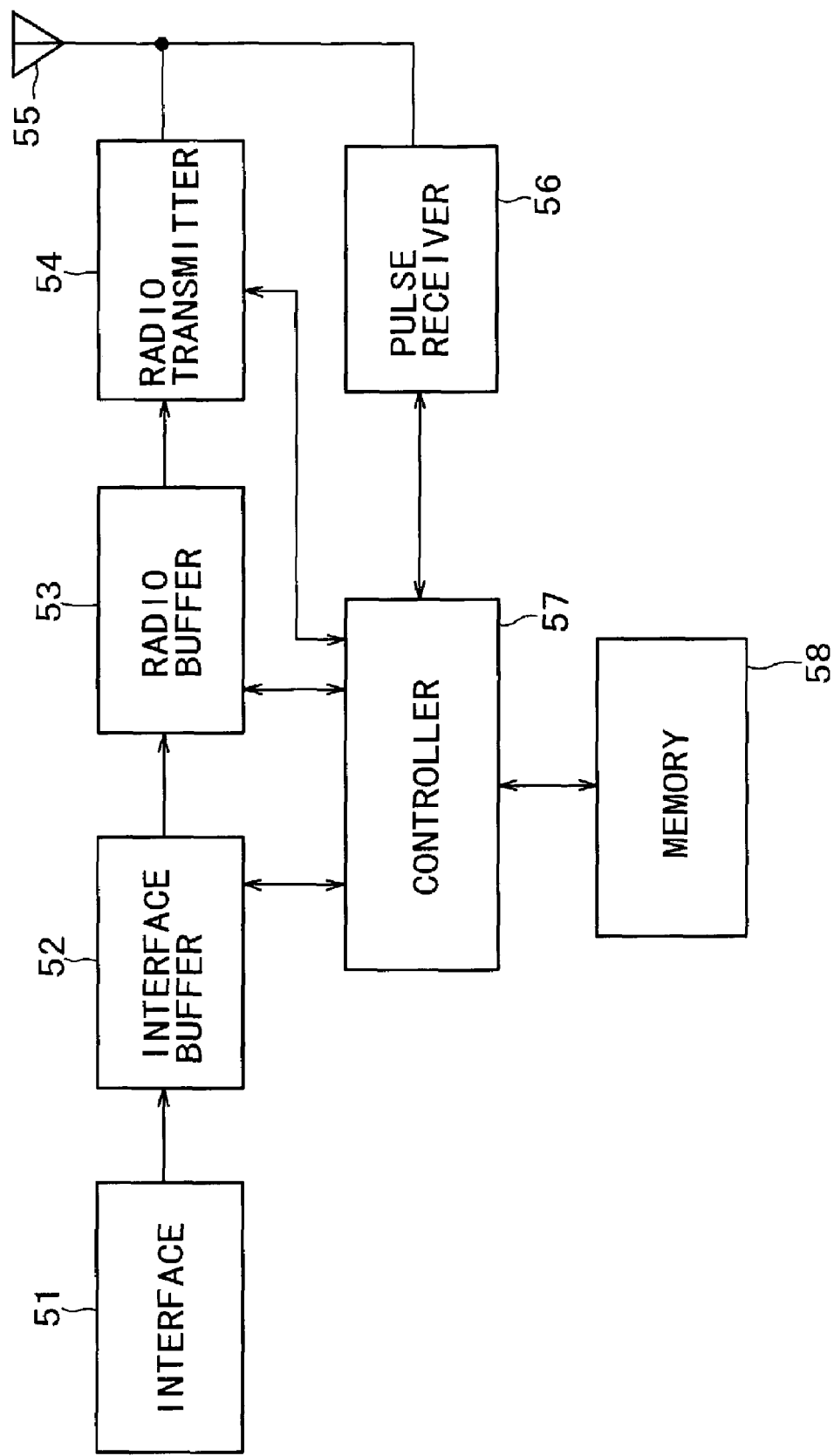
FIG. 5 is a diagram typically showing the functional configuration of a radio transmission unit capable of asynchronous radio communication in the wireless network 10 according to the embodiment.

FIG. 5 typically shows the functional configuration of the radio transmission unit of a radio communication device capable of asynchronous radio communication in the wireless network 10.

As shown in FIG. 5, the radio transmission unit consists of an interface 51, an interface buffer 52, a radio buffer 53, a radio transmitter 54, an antenna 55, a pulse receiver 56, a controller 57 and a memory 58.

The interface 51 is connected to the information sources of the main body of the associated computer system etc., receives predetermined information from the information sources and accumulates the received information temporarily in the interface buffer 52. The interface 51 reads information for transmission from the interface buffer 52, stores the read information temporarily in the radio buffer 53 and adds a preamble and header information for radio transmission to the stored information.

If the antenna 55 receives timing reference pulses transmitted from the timing generation device 100 in the wireless network 10, the pulse receiver 56 decodes them. If the reference pulses can be detected at the pulse receiver 56, the radio transmission unit is identified as included in the wireless network 10. In this case, immediately after the reference pulses are received, the information stored in the radio buffer 53 is transmitted by radio from the radio transmitter 54 through the antenna 55.

The controller 57 generally controls the operation of the radio transmission unit. The controller 57 may be a microcomputer and executes predetermined program codes to control the radio transmission in accordance with the received timing reference pulses. The memory 58 is connected locally to the controller 57 and can store a program for execution and data for processing.

The radio transmission unit can easily implement asynchronous communication with other devices by means of synchronous processing and/or transmission timing control based on the reference pulses. The radio transmission unit performs a network operation only while receiving timing reference pulses. Accordingly, if the radio transmission unit is positioned in the arrival range of the reference pulses, it can log in to the wireless network and easily perform asynchronous radio transmission by means of ad hoc communication.

The radio transmission unit may further include a network operation display (not shown), which displays the network operation in response to the reception of timing reference pulses. Based on the displayed network operation, the user can easily define the area of the wireless network. The timing generation devices of wireless networks may each generate a proper pattern of reference pulses. In this case, the controller 57 decodes the received pattern of reference pulses so that the radio transmission unit can detect which wireless network it is logging in to. Of course, each radio transmission unit may log in to two or more adjoining wireless networks at the same time. In this case, based on the proper patterns of reference pulses from the adjoining wireless networks, the radio transmission unit can detect its operation on each of these networks. The displayed network operation may be switched for the wireless network to which the radio transmission unit is logging in.

The radio transmission unit can acquire synchronism based on the timing reference pulses received from the timing generation device 100. Accordingly, even for UWB radio communication, there is no need to add a redundant preamble signal ahead of transmitted information in order to acquire initial synchronism.

Figure 6:
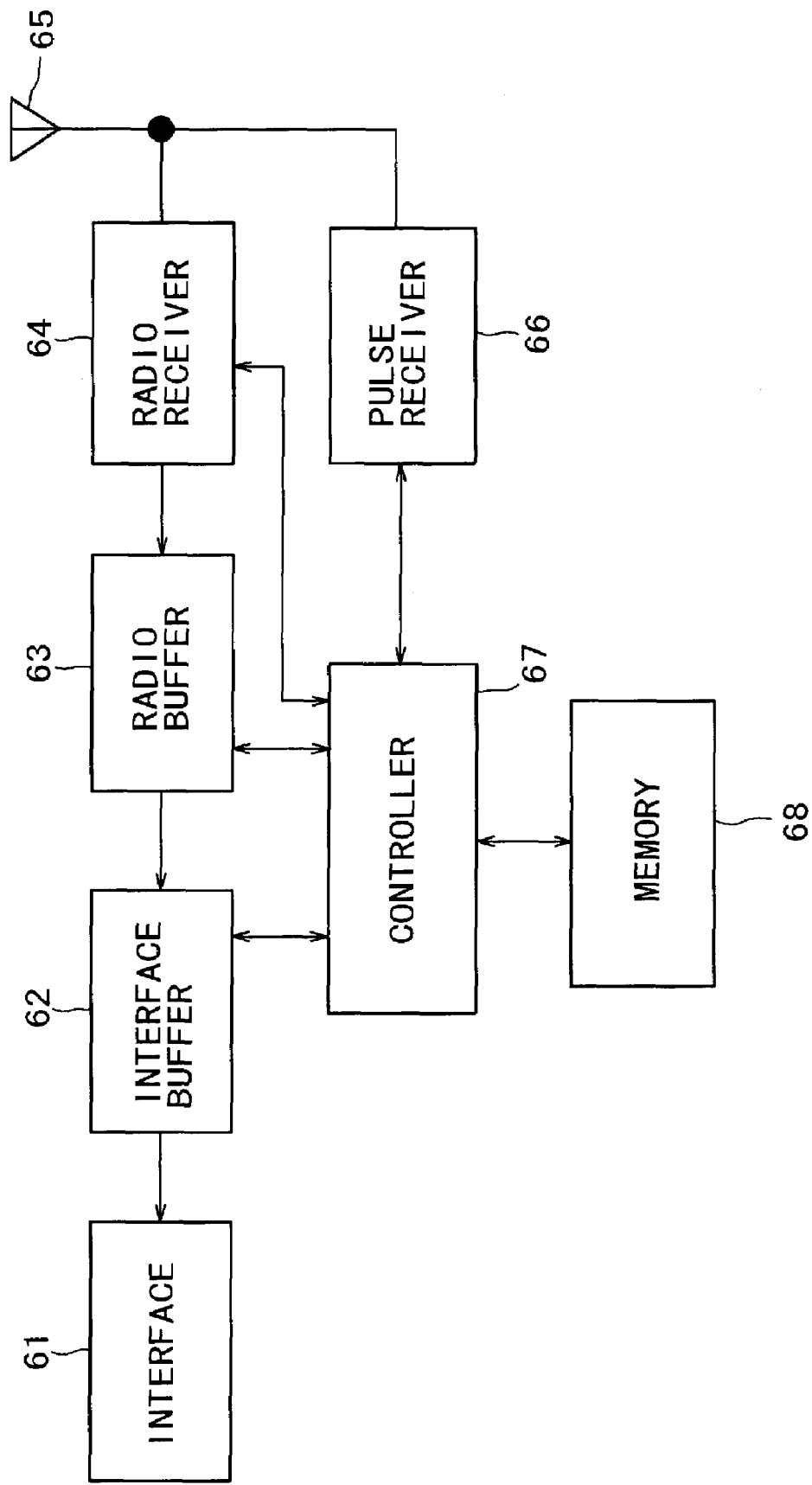
FIG. 6 is a diagram typically showing the functional configuration of a radio reception unit capable of asynchronous radio communication in the wireless network 10 according to the embodiment.

FIG. 6 typically shows the functional configuration of the radio reception unit of a radio communication device capable of asynchronous radio communication in the wireless network 10.

As shown in FIG. 6, the radio reception unit consists of an interface 61, an interface buffer 62, a radio buffer 63, a radio receiver 64, an antenna 65, a pulse receiver 66, a controller 67 and a memory 68.

If the antenna 65 receives timing reference pulses transmitted from the timing generation device 100 in the wireless network 10, the pulse receiver 66 decodes them. If the reference pulses can be detected at the pulse receiver 66, the radio reception unit determines that it is included in the wireless network 10.

Immediately after the timing reference pulses are received, information may be transmitted. Therefore, a receiving window as mentioned later on is set at that timing, and the radio receiver 64 is activated for reception.

The radio reception unit determines whether the signal received by the radio receiver 64 is information addressed to this receiver or not. If the signal is information addressed to this receiver, it is stored in the radio buffer 63, from which only the necessary information is supplied to the interface buffer 62.

Information is supplied sequentially through the interface 61 to the information destination (not shown), which maybe a computer system, connected to the radio reception unit.

The controller 67 generally controls the operation of the radio reception unit. The controller 67 may be a microcomputer and executes predetermined program codes to control the radio reception in accordance with the received timing reference pulses. The memory 68 is connected locally to the controller 67 and can store a program for execution and data for processing.

The radio reception unit can easily implement asynchronous communication with other devices by means of synchronous processing and/or reception timing control based on the reference pulses. The radio reception unit performs a network operation only while receiving timing reference pulses. Accordingly, if the radio reception unit is positioned in the arrival range of the reference pulses, it can log in to the wireless network and easily perform asynchronous radio transmission by means of ad hoc communication.

The radio reception unit may further include a network operation display (not shown), which displays the network operation in response to the reception of timing reference pulses. Based on the displayed network operation, the user can easily define the area of the wireless network. The timing generation devices of wireless networks may each generate a proper pattern of reference pulses. In this case, the controller 67 decodes the received pattern of reference pulses so that the radio reception unit can detect which wireless network it is logging in to. Of course, each radio reception unit may log in to two or more adjoining wireless networks at the same time. In this case, based on the proper patterns of reference pulses from the adjoining wireless networks, the radio reception unit can detect its operation on each of these networks. The displayed network operation may be switched for the wireless network to which the radio reception unit is logging in.

The radio reception unit can acquire synchronism based on the timing reference pulses from the timing generation device 100. Accordingly, even for UWB radio communication, there is no need to add a redundant preamble signal ahead of transmitted information in order to acquire initial synchronism.

FIGS. 5 and 6 show the radio transmission and reception units as separate units. Actually, these units may be replaced by a radio communication unit having both functions of radio transmission and radio reception.

Figure 7:
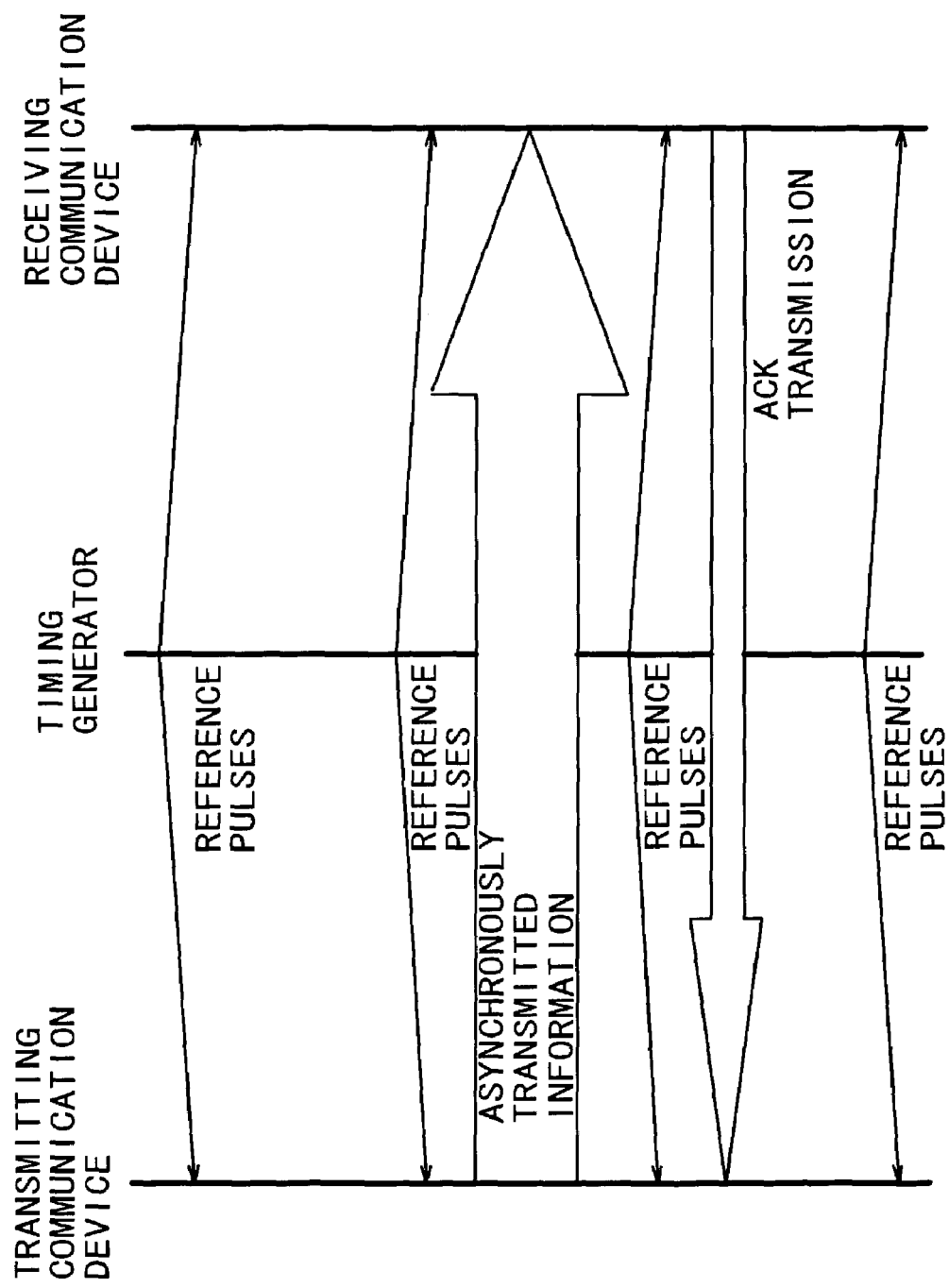
FIG. 7 is a diagram typically showing the radio communication sequence in the wireless network 10 according to the embodiment.

FIG. 7 typically shows the radio communication sequence in the wireless network 10.

As shown in FIG. 7, the timing generation device 100 generates timing reference pulses periodically at regular intervals. Based on timing reference pulses from the timing generation device 100, a communication device as an information sender transmits information asynchronously to a communication device as an information receiver.

Based on timing reference pulses from the timing generation device 100, the information receiver transmits an acknowledgment (ACK) in response to the asynchronously transmitted information to the information sender.

Figure 8:
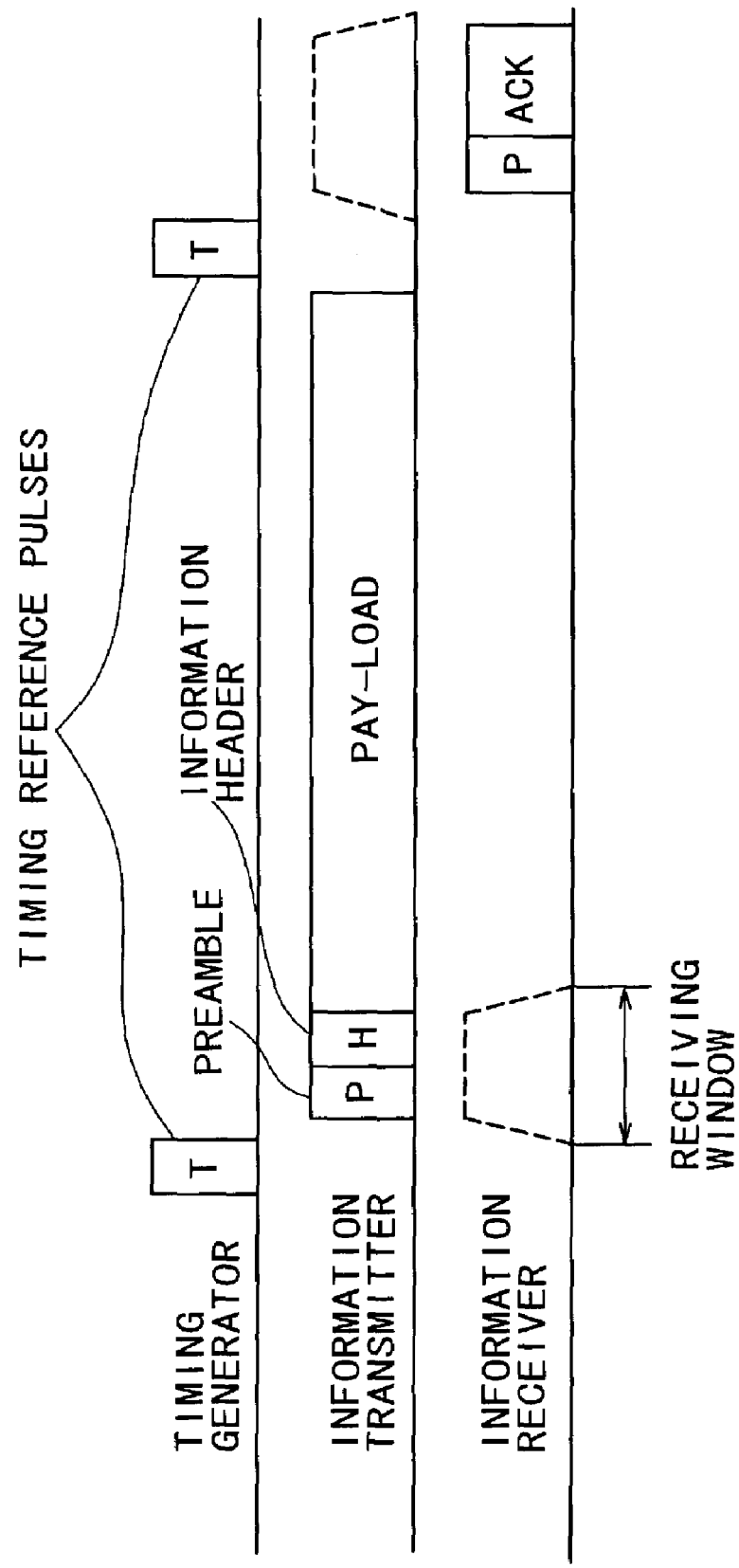
FIG. 8 is a diagram of information (data frame) structures for radio communication in the wireless network 10 according to the embodiment.

FIG. 8 shows information (data frame) structures for radio communication in the wireless network 10.

The timing reference pulses T generated periodically from the timing generation device 100 are a short pulsed signal train.

The information transmitted asynchronously from the information sender is pay-load information as a transmission data body, to which a preamble P and an information header H are added as redundant parts.

The acknowledgment from the information receiver is a short acknowledgment, to which a preamble P is added as a redundant part.

A receiving window is set in each of the communication devices.

The impulse signal trains for use in a UWB radio communication system have no specific frequency carriers. Accordingly, it is difficult to sense the carriers of the signal trains, and it is impossible to apply a CSMA/CA system directly for UWB radio communication. For UWB radio communication, in order to receive an asynchronous signal, it is necessary to add a redundant preamble signal ahead of transmitted information.

By contrast, the radio communication devices 101-107 can acquire the synchronism in the network 10 based on the reference pulses received from the timing generation device 100. Consequently, even for UWB radio communication, there is no need to add a redundant preamble signal ahead of transmitted information in order to acquire initial synchronism. Accordingly, by applying an access control system according to the present invention to UWB radio communication, it is possible to implement high speed asynchronous radio communication.

Figure 9:
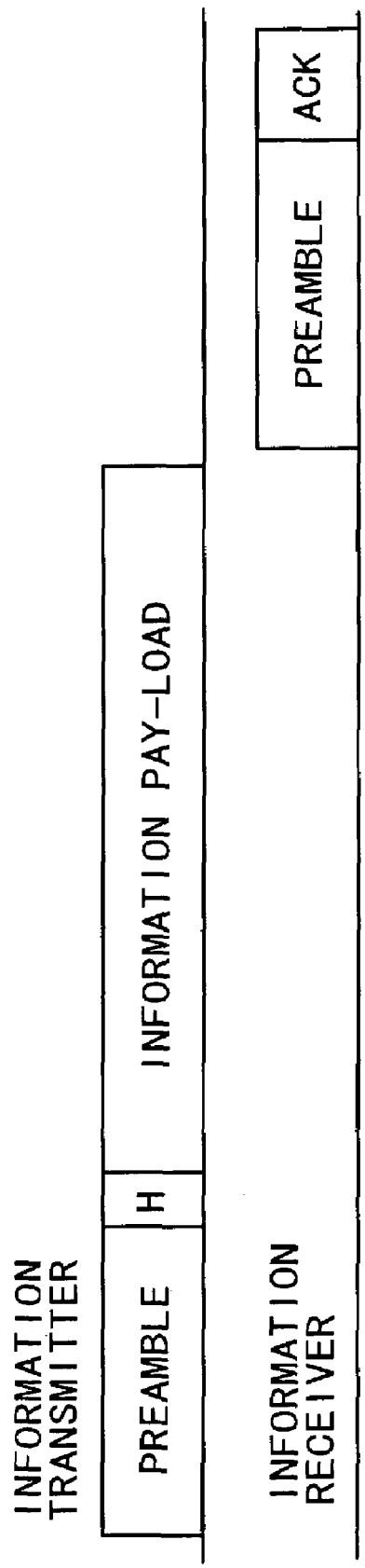
FIG. 9 is a diagram of information (data frame) structures for asynchronous radio communication performed without the timing reference pulses from the timing generation device 100.

For comparison with FIG. 8, FIG. 9 shows information (data frame) structures for asynchronous radio communication performed without the timing reference pulses from the timing generation device 100.

As shown in FIG. 9, information transmitted asynchronously by radio includes pay-load information, to which a redundant preamble and an information header H are added as redundant parts. As also shown, a communication device as an information receiver transmits a short acknowledgment with a redundant preamble added to the information.

Thus the addition of a redundant preamble is a general way, and it is a factor in the decrease in transmission channel utilization efficiency.

Information may be sent asynchronously to a communication device as an information receiver, without preparations made. It is accordingly necessary to perform receiving processing while always monitoring the radio transmission channel. This makes it difficult to lower the power consumption by the device.

Figure 10:
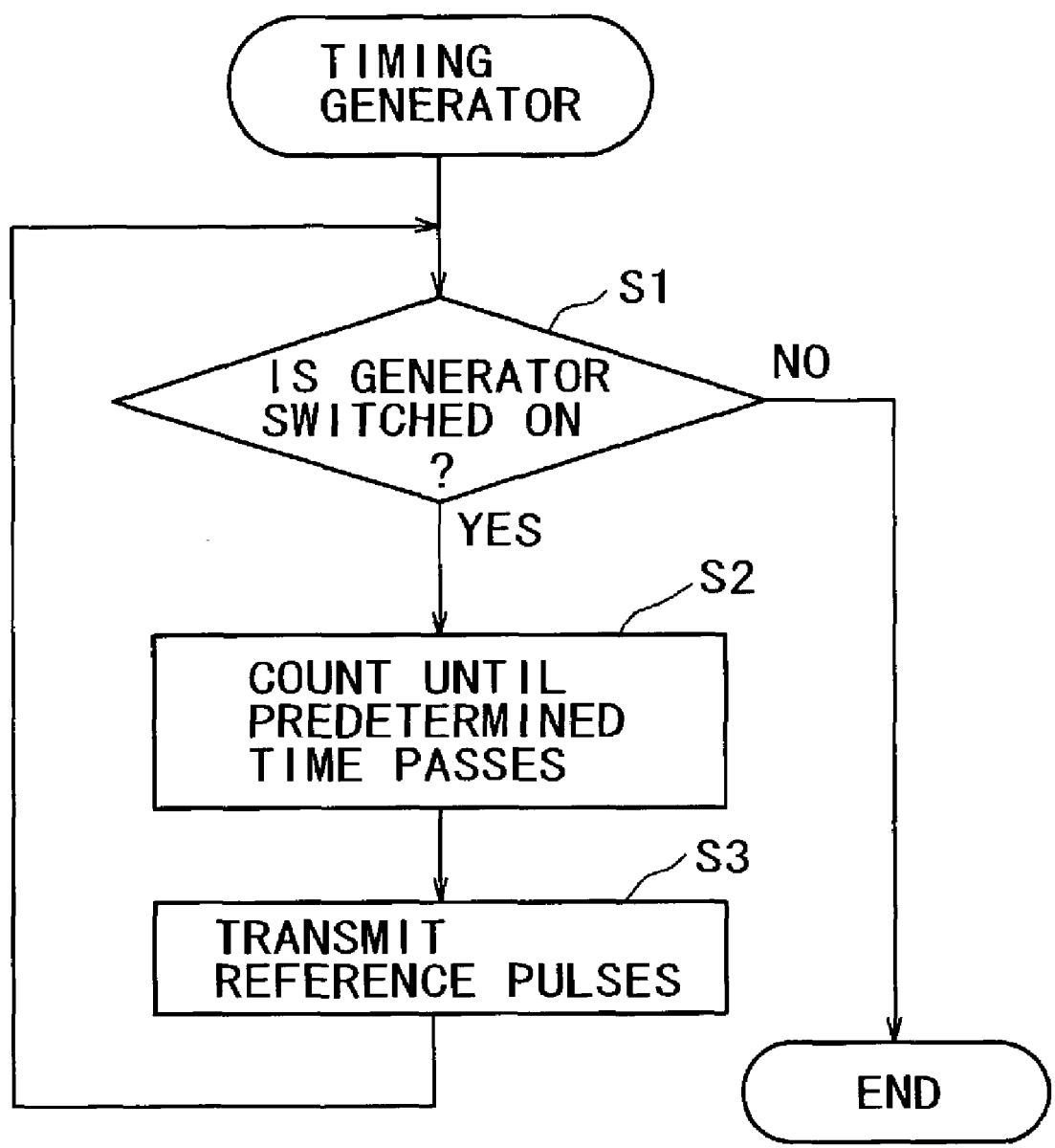
FIG. 10 is a flowchart of the operation procedure run by the timing generation device 100, which operates in the wireless network 10 according to the embodiment.

FIG. 10 is a flowchart of the operation procedure run by the timing generation device 100, which operates in the wireless network 10. Actually, this procedure is implemented by the controller 43 running predetermined program codes.

At the first step S1 of the procedure, the controller 43 determines whether the operating switch 41 of the timing generation device 100 is on or not.

If the operating switch 41 is on, the procedure moves to the step S2, where the controller 43 counts until a predetermined time passes. After the predetermined time passes, the procedure moves to the step S3, where the pulse transmitter 44 transmits timing reference pulses.

If the operating switch 41 is off, the reference pulse generator 42 stops generating timing reference pulses, and the whole of this processing routine ends.

Figure 11:
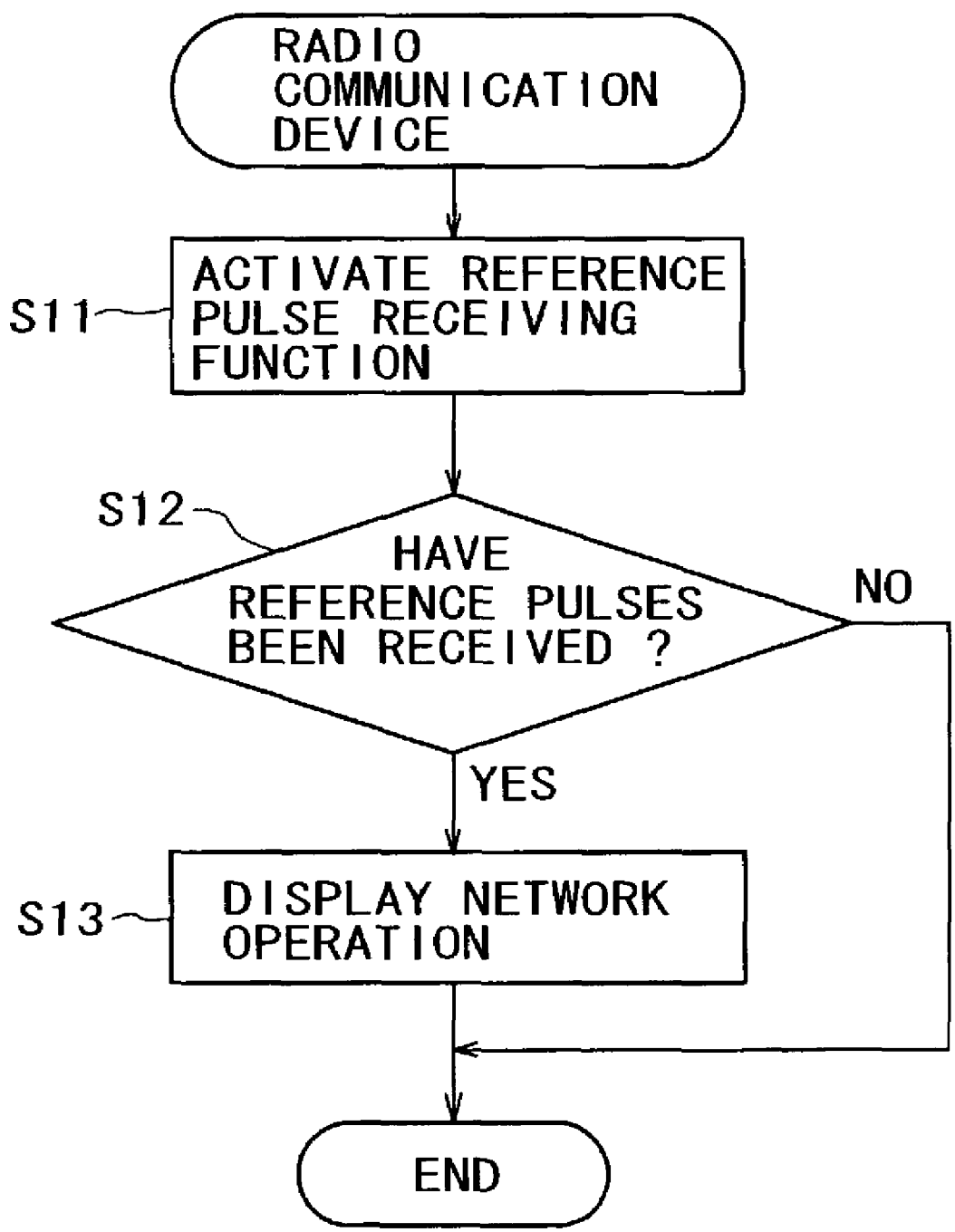
FIG. 11 is a flowchart of the network operation of a radio communication device in the wireless network 10 according to the embodiment.

FIG. 11 is a flowchart of the network operation of each radio communication device included in the wireless network 10. Actually, the procedure for this operation is implemented by the associated controllers 57 and 67 running predetermined program codes.

After the radio communication device starts operating, it activates, at the first step S11 of the procedure, its receiving function to receive timing reference pulses from the timing generation device 100.

Then, the procedure moves to the step S12, where the controllers 57 and 67 determine whether the radio communication device has received timing reference pulses or not. If timing reference pulses have been received, the radio communication device logs in to the wireless network 10, which is defined by the timing generation device 100. In this case, the procedure moves to the step S13, where it is indicated that the radio communication device operates as a communication device of the wireless network 10.

If no timing reference pulse has been received for a predetermined time, the radio communication device does not log in to the wireless network 10, and it is not indicated that the radio communication device operates as a communication device of the wireless network 10.

FIG. 12 is a flowchart of the procedure according to which each radio communication device included in the wireless network 10 transmits information. Actually, this procedure is implemented by the associated controller 57 running predetermined program codes.

At the first step S21 of the procedure, the controller 57 determines whether or not the radio communication device has received information from the source connected to the interface 51 of this device.

If the radio communication device has received information from the source, this procedure moves to the step S22, where the controller 57 determines whether the wireless network 10 is in operation or not. If the wireless network 10 is in operation, the procedure moves to the step S23, where the associated radio transmitter 54 transmits the received information based on the received timing reference pulses.

Then, the procedure moves to the step S24, where the controller 57 determines whether or not the radio communication device has received an acknowledgment in response to its information transmission. If so, the whole of this processing routine ends.

If the radio communication device has received no acknowledgment, the procedure moves to the step S22, where the controller 57 reconfirms the operation of the wireless network 10.

If it is determined at the step S22 that the wireless network 10 is not operating, the procedure moves to the step S25, where the controller 57 causes the interface 51 to be informed that no transmission was possible. Then, the whole of this processing routine ends.

FIG. 13 is a flowchart of the procedure according to which each radio communication device included in the wireless network 10 receives information. Actually, this procedure is implemented by the associated controller 67 running predetermined program codes.

At the first step S31 of the procedure, the controller 67 determines whether the wireless network 10 is in operation or not. If so, the procedure moves to the step S32, where the associated radio receiver 64 receives information, with a predetermined receiving window following a timing reference pulse.

After the information is received, the procedure moves to the step S33, where the controller 67 determines whether or not the received information is addressed to the radio communication device. If so, the procedure moves to the step S34, where the radio communication device transmits an acknowledgment in response to the information.

Then, the procedure moves to the step S35, where the control 67 causes the associated interface 61 to be supplied with the received information, and where this interface outputs the information to the destination device (not shown) connected to it. Then, the whole of this processing routine ends.

If it is determined at the step S31 that the wireless network 10 is not operating, the routine ends. Likewise, if it is determined at the step S33 that the received information is not addressed to the radio communication device, the routine ends.

The present invention has been described hereinbefore in detail with reference to its specific embodiment. However, it is apparent that modifications and alterations of the embodiment might be made by those skilled in the art without departing from the spirit and scope of the invention. In other words, the invention is disclosed herein by way of example, and the disclosure should not be construed in limited senses. The spirit of the invention should be interpreted with the appended claims taken into consideration.

As described hereinbefore in detail, the present invention makes it possible to provide an improved radio communication system, an improved radio communication method, an improved wireless network forming device, an improved radio transmission unit, an improved radio transmission method, an improved radio reception unit and an improved radio reception method that are capable of asynchronous radio communication without providing any device as a control station.

The present invention also makes it possible to provide an improved radio communication system, an improved radio communication method, an improved wireless network forming device, an improved radio transmission unit, an improved radio transmission method, an improved radio reception unit and an improved radio reception method that are capable of asynchronous communication even in a radio communication environment where the carrier sense for determining how a transmission channel is used is difficult.

The present invention further makes it possible to provide an improved radio communication system, an improved radio communication method, an improved wireless network forming device, an improved radio transmission unit, an improved radio transmission method, an improved radio reception unit and an improved radio reception method that are capable of asynchronous communication, with a radio transmission channel used efficiently, on the UWB (ultra wide band) system or another radio communication system on which carrier sense is difficult.

What is claimed is:

1. A radio communication system for ad hoc communication, comprising:
    a timing generation device for transmitting reference pulses at predetermined intervals; and
    a plurality of radio communication devices located in an arrival range of the reference pulses and forming a wireless network;
    at least one communication between at least two devices within the network being carried out asynchronously within a predetermined window defined by the reference pulses, transmission between said at least two devices being initiated in response to one or more of the reference pulses transmitted by the timing generation device, wherein the at least two devices do not transmit the reference pulses.

2. A radio communication method for ad hoc communication comprising the step of forming a wireless network using a plurality of radio communication devices, the devices existing in an arrival range of reference pulses transmitted at predetermined intervals from a timing generation device;
    at least one communication between at least two devices within the network being carried out asynchronously within a predetermined window defined by the reference pulses, transmission between said at least two devices being initiated in response to one or more of the reference pulses transmitted by the timing generation device, wherein the at least two devices do not transmit the reference pulses.

3. The radio communication method as set forth in claim 2, wherein each of the radio communication devices performs synchronous processing based on the reference pulses received thereby.

4. The radio communication method as set forth in claim 2, wherein each of the radio communication devices performs transmit-receive timing control based on the reference pulses received thereby.

5. The radio communication method as set forth in claim 2, wherein the timing generation device performs one of starting and stopping transmitting the reference pulses in response to a user operation, and wherein the wireless network is built in the arrival range of the reference pulses only while the pulses are transmitted.

6. The radio communication method as set forth in claim 2, wherein the timing generation device generates a predetermined pattern of reference pulses.

7. A network forming device for building a wireless network for asynchronous information transmission using a plurality of radio communication devices, the network forming device comprising:
- a signal generator for generating reference pulses at predetermined intervals used by the radio communication devices in the wireless network for at least one of synchronous processing and transmit-receive timing control; and
- a signal transmitter for transmitting the generated reference pulses;
- at least one communication between at least two devices within the network being carried out asynchronously within a predetermined window defined by the reference pulses, transmission between said at least two devices being initiated in response to one or more of the reference pulses transmitted by the signal transmitter, wherein the at least two devices do not transmit the reference pulses.

8. The network forming device as set forth in claim 7, and further comprising a user input means for accepting a user operation, wherein the signal transmitter performs one of starting and stopping transmitting reference pulses in response to a user operation through the user input means.

9. The network forming device as set forth in claim 7, wherein the signal generator generates a predetermined pattern of reference pulses.

10. A radio transmission unit for operating in a wireless network for ad hoc communication, the unit comprising:
- means for receiving reference pulses transmitted from a predetermined network forming device; and
- means for starting to transmit information based on the received reference pulses;
- at least one communication between at least two devices within the network being carried out asynchronously within a predetermined window defined by the reference pulses, transmission between said at least two devices being initiated in response to one or more of the reference pulses transmitted by the network forming device, wherein the at least two devices do not transmit the reference pulses.

11. The radio transmission unit as set forth in claim 10, wherein a network operation is performed only while reference pulses are received.

12. The radio transmission unit as set forth in claim 10, and further comprising means for displaying a network operation in response to the reception of reference pulses.

13. A radio transmission method for use in a wireless network for ad hoc communication, comprising the steps of:
- receiving reference pulses transmitted from a predetermined network forming device; and
- starting to transmit information based on the received reference pulses;
- at least one communication between at least two devices within the network being carried out asynchronously within a predetermined window defined by the reference pulses, transmission between said at least two devices being initiated in response to one or more of the reference pulses transmitted by the network forming device, wherein the at least two devices do not transmit the reference pulses.

14. The radio transmission method as set forth in claim 13, wherein a network operation is performed only while reference pulses are received.

15. The radio transmission method as set forth in claim 13, and further comprising the step of displaying a network operation in response to the reception of reference pulses.

16. A radio reception unit for operating in a wireless network for ad hoc communication, the unit comprising:
- means for receiving reference pulses transmitted from a predetermined network forming device; and
- means for starting to receive information based on the received reference pulses;
- at least one communication between at least two devices within the network being carried out asynchronously within a predetermined window defined by the reference pulses, transmission between said at least two devices being initiated in response to one or more of the reference pulses transmitted by the network forming device, wherein the at least two devices do not transmit the reference pulses.

17. The radio reception unit as set forth in claim 16, wherein a network operation is performed only while reference pulses are received.

18. The radio reception unit as set forth in claim 16, and further comprising means for displaying a network operation in response to the reception of reference pulses.

19. A radio reception method for use in a wireless network for ad hoc communication, comprising the steps of:
- receiving reference pulses transmitted from a predetermined network forming device; and
- starting to receive information based on the received reference pulses;
- at least one communication between at least two devices within the network being carried out asynchronously within a predetermined window defined by the reference pulses, transmission between said at least two devices being initiated in response to one or more of the reference pulses transmitted by the network forming device, wherein the at least two devices do not transmit the reference pulses.

20. The radio reception method as set forth in claim 19, wherein a network operation is performed only while reference pulses are received.

21. The radio reception method as set forth in claim 19, and further comprising the step of displaying a network operation in response to the reception of reference pulses.

* * * * *